(12) United States Patent
Yin et al.

(10) Patent No.: US 12,392,867 B2
(45) Date of Patent: Aug. 19, 2025

(54) TIME-CONTINUOUS POWER MONITORING FOR RADAR APPLICATIONS

(71) Applicant: NXP B.V., Eindhoven (NL)

(72) Inventors: Yi Yin, Munich (DE); Birama Goumballa, Larra (FR); Olivier Vincent Doare, La Salvetat St Gilles (FR); Julien Orlando, Toulouse (FR)

(73) Assignee: NXP B.V., Eindhoven (NL)

( * ) Notice: Subject to any disclaimer, the term of this patent is extended or adjusted under 35 U.S.C. 154(b) by 429 days.

(21) Appl. No.: 18/045,486

(22) Filed: Oct. 11, 2022

(65) Prior Publication Data

US 2024/0012107 A1    Jan. 11, 2024

(30) Foreign Application Priority Data

Jul. 11, 2022  (EP) .................................... 22306045

(51) Int. Cl.
| | | |
|---|---|---|
| *G01S 7/40* | (2006.01) | |
| *G01S 7/03* | (2006.01) | |
| *G01S 13/931* | (2020.01) | |

(52) U.S. Cl.
CPC .................. *G01S 7/40* (2013.01); *G01S 7/03* (2013.01); *G01S 13/931* (2013.01)

(58) Field of Classification Search
CPC ........ H03M 1/66; G01S 13/931; G01S 13/34; G01S 7/40; G01S 7/4065; B60R 16/03; G01R 21/00; G01R 31/2832; G01R 31/2891; G06F 21/552; H04B 2001/0416
See application file for complete search history.

(56) References Cited

U.S. PATENT DOCUMENTS 5,977,831 A  * 11/1999  Davis .................. H03G 3/3042
                                                        330/129
2010/0277359 A1 * 11/2010  Ando ...................... G01S 13/34
                                                        342/70

FOREIGN PATENT DOCUMENTS

CN          115480234 A  * 12/2022  ............. G01S 7/497

OTHER PUBLICATIONS

Reuter, R. et al; "Fully Integrated SiGe-BiCMOS Receiver (RX) and Transmitter(TX) Chips for 76.5 GHz FMCW Automotive Radar Systems Including Demonstrator Board Design"; IEEE/MTT-S Int'l Microwave Symposium; pp. 1307-1310 (Jun. 2007).

* cited by examiner

*Primary Examiner* — Vladimir Magloire
*Assistant Examiner* — Peter Davon Doze

(57) ABSTRACT

A first input signal that corresponds to an output transmitted signal of an amplifier of a vehicle radar system is received and a digital threshold signal is transmitted to an input terminal of a digital-to-analog converter. The digital-to-analog converter is configured to generate an analog threshold value that is at least partially determined by a digital threshold value encoded into the digital threshold signal. If it is determined that a magnitude of the first input signal is less than a magnitude of the analog threshold value, a flag signal is transmitted to a system controller. The flag signal is indicative that a power level of the first output signal has fallen below a safety threshold value.

18 Claims, 5 Drawing Sheets

TIME-CONTINUOUS POWER MONITORING FOR RADAR APPLICATIONS

CROSS-REFERENCE TO RELATED APPLICATIONS

This application claims the priority under 35 U.S.C. § 119 of European patent application no. 22306045.0, filed Jul. 11, 2022 the contents of which are incorporated by reference herein.

TECHNICAL FIELD

The embodiments of the present disclosure described herein relate to radar systems and methods of their operation and, more specifically, to systems and methods for monitoring a power level of an output signal of a vehicle radar system.

BACKGROUND

A radar system transmits an electromagnetic signal and receives back reflections of the transmitted signal. The time delay between the transmitted and received signals can be determined and used to calculate the distance and/or the speed of objects causing the reflections. For example, in automotive applications, radar systems can be used to determine the distance and/or the speed of oncoming vehicles and other obstacles.

To ensure proper operation of a vehicle radar system it can be desirable to monitor the power of the electromagnetic signals being transmitted by the system to confirm that the system's output power is greater than that a specified power level required for proper operation of the radar system. For automotive radar application, for example, a safety mode of operation of a vehicle radar system may cause the system to operate at its minimum allowable output power (i.e., an output power level is 3 dB lower than its normal operation power). If the system's output power is even lower than that safety mode threshold, the radar system may not function properly, resulting in objects and vehicles that cannot be detected even at 90% of the system's operational distance. If the radar system is not transmitting signals at an appropriate power level, therefore, such condition may be indicative of a general fault in the radar system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary or an example is not necessarily to be construed as preferred or advantageous over other implementations. Furthermore, there is no intention to be bound by any expressed or implied theory presented in the preceding technical field, background, or the following detailed description.

The present disclosure provides a system and method for monitoring the operation of a radar device, such as a vehicle radar system, to detect potential faults therein. Specifically, the system and method may be configured to monitor the output power of a transmit power amplifier of the vehicle radar system (and, consequently the signals transmitted by the vehicle radar system) to determine whether the output power falls within an allowable threshold range.

In general, the embodiments described herein provide for time-continuous monitoring of a radar system's transmit power to detect a condition in which the output power of the vehicle radar systems falls below an allowable threshold. Upon detecting that the output power has fallen below that allowable threshold, the system can trigger an alert flag and send information to a vehicle controller, in which a vehicle safety manager can launch a fault recovery operation by vehicle radar system software. Then, if the fault recovery is not successful before expiration of an alarm timer, a reset of the vehicle radar system hardware can be initiated. If that is successful, normal vehicle radar system operations resume. As such, the embodiments of the power monitor of the present disclosure can provide improved operation of a vehicle radar system to provide reliability and error detection.

Figure 1:
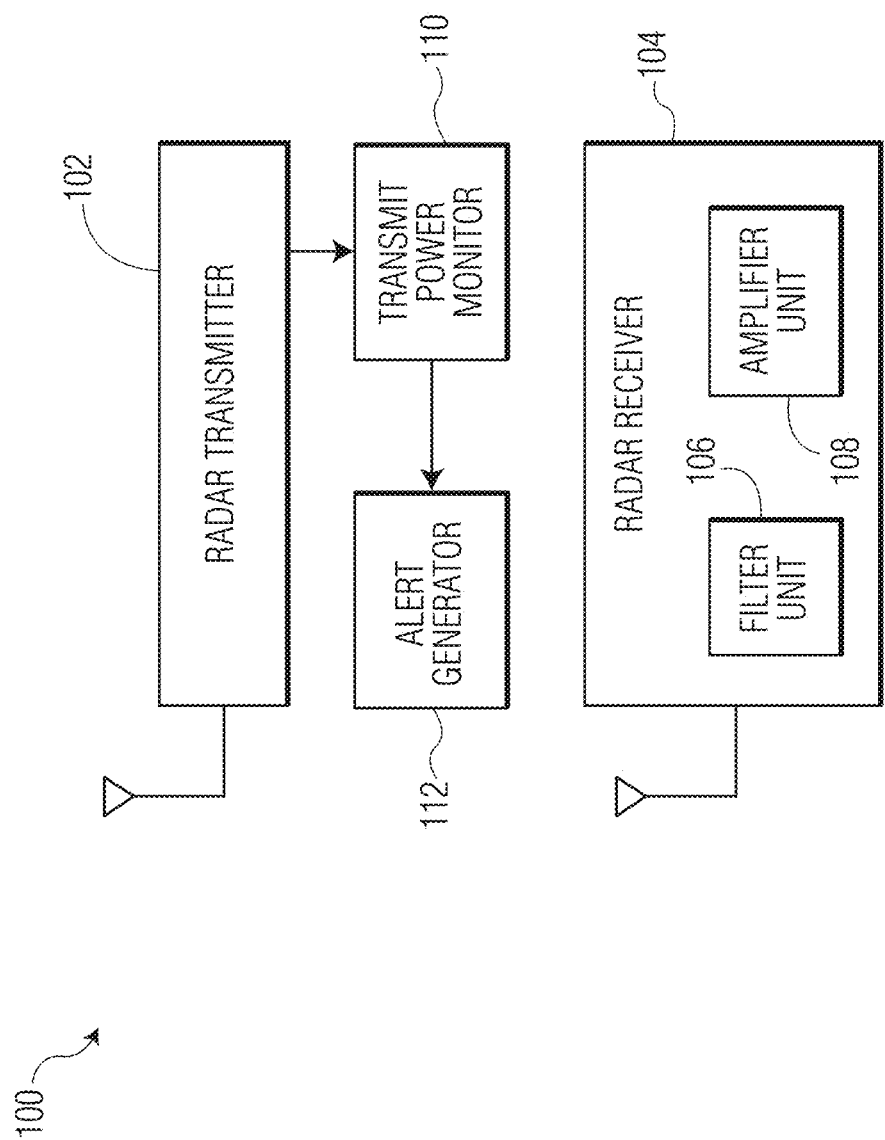
FIG. 1 is a block diagram depicting function components of a vehicle radar system.

FIG. 1 is a block diagram depicting functional components of a vehicle radar system 100 in accordance with the present disclosure (when incorporated into a vehicle, vehicle radar system 100 may sometimes be referred to as a vehicle radar subsystem). Vehicle radar system 100 includes at least one radar transmitter 102, at least one radar receiver 104, transmit power monitor 110, and an alert generator 112. The radar transmitter 102 includes a power amplifier configured to output an amplified electromagnetic signal to a suitable radiation element or antenna to transmit a radar signal, and the radar receiver 104 is configured to receive a signal either on the same or different antenna that include reflections of the transmitted radar signal from external objects. The radar receiver 104 includes at least one filter unit 106 configured to filter the received radar signal and at least one amplifier unit 108 configured to amplify the received radar signal to enable analysis and processing of that received radar signal.

In accordance with the embodiments described herein, transmit power monitor 110 is coupled to radar transmitter 102 and, specifically, the power amplifier of radar transmitter. Transmit power monitor 110 is configured to time-continuously monitor the output power of the power amplifier of radar transmitter 102. If the transmit power monitor 110 generates an output (e.g., a signal) having a value that indicates the output power of signals transmitted by radar transmitter 102 have fallen outside of allowable limits (i.e., that a potential fault or malfunction has occurred in the operation of vehicle radar system 100), alert generator 112 is configured to generate an output alerting vehicle radar system 100 or a general vehicle controller of the potential fault. Upon receipt of that alert message, vehicle radar system 100 or the vehicle controller may take actions to indicate to an operator of the vehicle of the fault condition or to take further steps to potentially correct or mitigate the issue, such as by re-executing an output power calibration routine. If the recovery is not successful before the end of an alarm timer, then a reset of the vehicle radar system 100 can be executed. If the reset is successful, normal radar acquisition may continue.

In various implementations, transmit power monitor 110 is configured to provide time-continuous level monitoring (TCM) of the power of signals transmitted by radar transmitter 102. As described herein, transmit power monitor 110 is configured to directly compare a magnitude of the power of a coupled portion of the electromagnetic signal being transmitted by radar transmitter 102 and an analog reference value. The analog reference value has a magnitude equal to (or nearly equal to) the magnitude of a peak-peak detector (PPD) incorporated into transmit power monitor 110, where the PPD is configured to convert a coupled vehicle radar system 100 transmit signal into a DC signal, when the radar transmitter 102 is transmitting a radar signal with the minimum allowable output power.

By continuously comparing the magnitude of the coupled portion of the electromagnetic signal (i.e., determined using the PPD) to the analog reference signal, the present transmit power monitor 110 is able to time-continuously monitor the output power of the radar transmitter 102 of the vehicle radar system 100 to promptly give a flag signal 'HIGH' indicating an adequate transmitter power or 'LOW' indicating a potential malfunctions due to inadequate transmitter power.

In some embodiments, transmit power monitor 110 includes a finite impulse response (FIR) filter that is configured to perform filtering on the signal received from a comparator configured to compare the signal received from the PPD to the analog reference signal to deglitch the comparator output. This mechanism is useful when the comparator input level is close to the analog threshold reference. In this case the comparator output may toggle and then does not show a clear flag signature for potential false alerts.

In these various embodiments, transmit power monitor 110 may provide improved performance over other power sensors that rely on expense built-in self-test (BIST) analog sensors that require post processing of captured data to generate an output indicative of the measured power values. These approaches are not only expensive, but also require more time in order to monitoring the output power because of a demand for later post-processing by the software to account for errors. Consequently, it may not be possible to monitor power level time-continuously at whole power transmitter phase in such systems.

Figure 2:
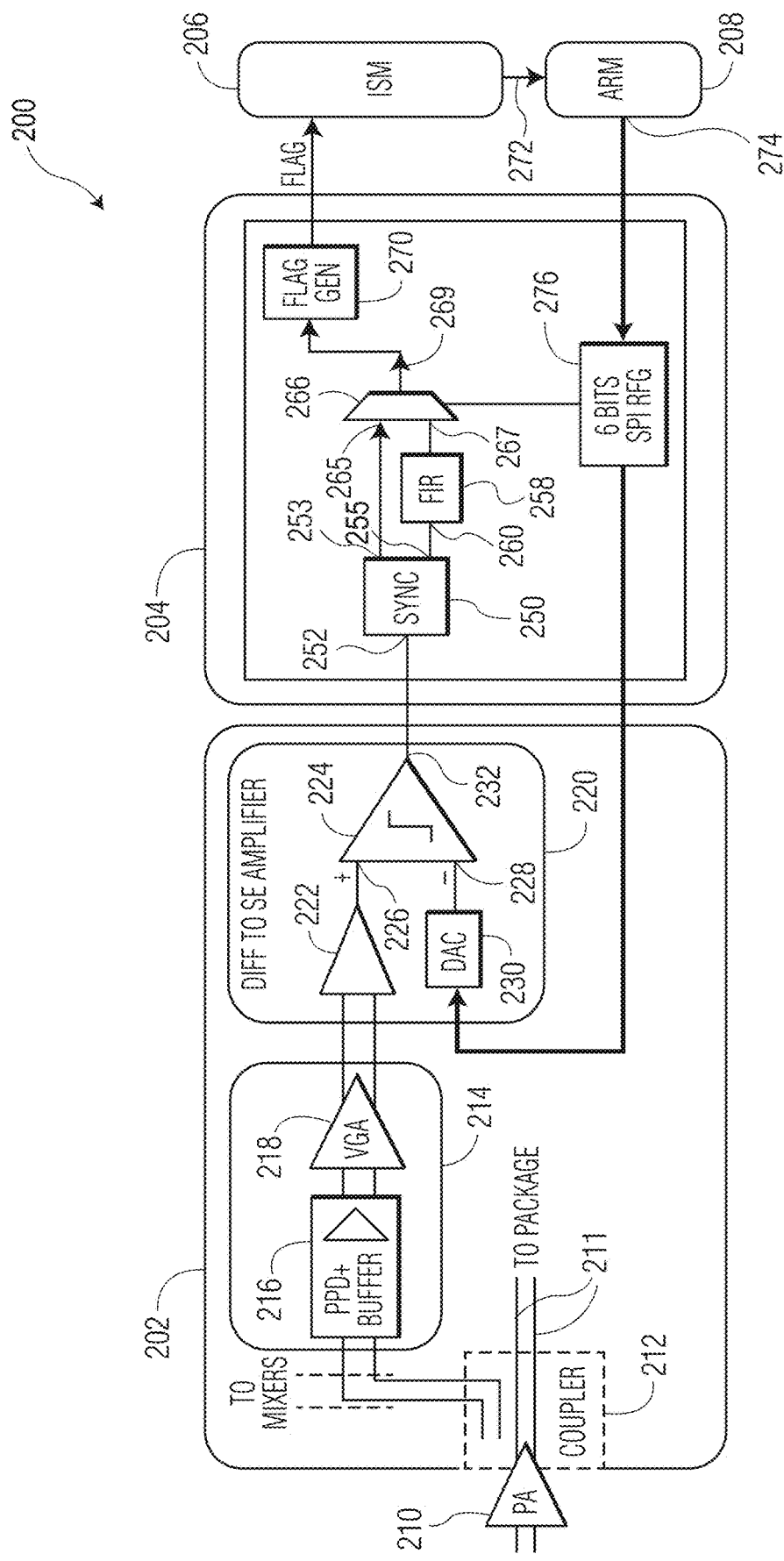
FIG. 2 is a block diagram depicting functional components of a time-continuous power monitor (TCM) that is connected to a power amplifier of a vehicle radar system, in accordance with the present disclosure.

FIG. 2 is a block diagram depicting functional components of transmit power monitor 200 (e.g., transmit power monitor 110, FIG. 1) in accordance with the present disclosure. Transmit power monitor 200 includes two distinct functional blocks that comprise an input-side analog block 202 that provides initial analog processing of an input signal coupled from a power amplifier (PA) output and converts that coupled analog signal into a digital output signal, and a digital block 204 that applies digital processing to the digital signal received from input-side analog block 202 and generates as output digital control signals that affect the operation of transmit power monitor 200, as described herein.

An output signal generated by digital block 204 is further processed and analyzed by a software-implemented inner safety monitor (ISM) 206 and a microcontroller ARM7 block 208 which are configured to control the operation of transmit power monitor 200 to implement specific functionality such as monitoring of a power level of a signal transmitted by a vehicle radar system and initial calibration of transmit power monitor 200. ISM 206 and ARM7 block 208 may also be configured to generate appropriate system-level responses upon detection of flag signals from digital block 204 indicating that transmit power levels detected by transmit power monitor 200 fall below (or otherwise exceed or cross) a predetermined threshold. In various implementations, ISM 206 is a central controller that manages generation of the transmit power monitor 200's safety flag, while ARM7 block 208 is a microcontroller configured to control the transmit power monitor 200 using various serial peripheral interface (SPI) protocols.

Input-side analog block 202 is connected at its input side to a power amplifier 210. Power amplifier 210 may be the power amplifier of a vehicle radar system being monitored (e.g., a power amplifier implemented within radar transmitter 102 of FIG. 1). Power amplifier 210 is configured to generate an amplified electromagnetic signal (e.g., a radar signal) that is output by power amplifier 210 at output terminals 211 as a transmitted signal. The differential output signal generated by power amplifier 210 at output terminals 211 of power amplifier 210 are inputs to coupler 212 at the signal path. Specifically, the input terminals to coupler 212 are connected to a transmit antenna of a vehicle radar system and, as such, a magnitude of the signal output by power amplifier 210 is the same as (or directed related to) the magnitude of the signal that will ultimately be output or transmitted by the transmit antenna of the vehicle's radar system.

Coupler 212 is a four terminal device, with two input terminals and two output terminals (IN, OUT, respectively) connected in the signal transmitter path. Among them, the output terminals 211 of power amplifier 210 are connected to the two input terminals of coupler 212. The coupled portions of the differential output signal of power amplifier 210 (i.e., the TX output power of the vehicle system) is coupled through coupler 212 to input-side analog block 202 of transmit power monitor 200. Coupler 212 may be implemented in any suitable manner so as to couple a portion of the differential output signal of power amplifier 210 into the input-side of analog block 202. Coupler 212 may include, for example, capacitive couplers or millimeter-wave directional coupler, etc. any kind of coupler. In other embodiments, the input terminals of coupler 212 may be connected at any points in the transmit signal path of power amplifier 210 to the antenna or to any other power amplifiers in which the amplifier's output power level is to be monitored.

Coupler 212 is connected to peak-to-peak detector (PPD) 214 (alternatively referred to as a power sensor (PS)) so that the portions of the output signals of power amplifier 210 coupled by coupler 212 are provided as inputs into PPD 214. PPD 214 is configured to convert the coupled portion of the differential output of power amplifier 210 to a differential direct-current (DC) signal having a magnitude that is equal to or proportional to the magnitude of the peaks of the coupled signal generated by coupler 212; whereas PPD 214 is configured to convert the coupled portion of the differential output of power amplifier 210 to a differential direct-current (DC) signal having a magnitude that is equal to or proportional to the magnitude of the output power of the coupled signal generated by coupler 212;

Specifically, PPD 214 includes a PPD buffer 216 coupled in series to variable gain amplifier (VGA) 218. PPD buffer 216 is configured to receive, as input, the coupled signal generated by coupler 212 and general an output equivalent to the peak values or equivalent to the power value of the input signal. PPD buffer 216 includes a number of buffers so that the PPD buffer 216 output is amplified to a full-scale DC signal for the requested transmit power range. The buffers of PPD buffer 216 may be implemented using closed-loop operational amplifier (op-amp) components or any kind of amplifier having certain gain.

That output from PPD buffer 216 is then passed to VGA 218 which comprises an amplifier configured to amplifier the DC output signal received from PPD buffer 216 into a full-scale signal with minimum values equal to or approximately equal to a ground level and maximum values equal to or approximately equal to a power supply voltage of VGA 218. The output of VGA amplifier 218 is connected to level detector block 220. Specifically, the differential outputs of amplifier 218 are connected to the two differential inputs of differential-to-single-ended amplifier 222, which is configured to convert the differential input signals of differential-to-single-ended amplifier 222 to a single-ended output signal, where a magnitude of the single-ended output signal referenced against a ground voltage is equal to a magnitude of the voltage between the differential input signals. Amplifier 222 may be implemented as a differential amplifier with an adjustable gain. During operation of transmit power monitor 200 the gain of amplifier 222 may be adjusted dependent upon the transmit power level of power amplifier 210. For example, at a low transmit power levels, where the PPD 214 output signal is low power, a high gain can be selected for amplifier 222 without causing the output signal of amplifier 222 to become saturated.

The single ended output of amplifier 222 is supplied as a first input signal to comparator 224 at first input terminal 226. Comparator 224 includes a second input terminal 228 configured to receive an analog reference signal from digital-to-analog converter 230.

DAC 230 is configured to receive a digital control signal comprising or encoding a digital threshold value (e.g., a 6-bit digital value that can be set to 63 different values, where each digital value corresponds to a different analog reference voltage generated by DAC 230) that causes DAC 230 to convert that input digital signal into an analog threshold signal that is supplied as an input to second input terminal 228, as described further, below.

Comparator 224 is configured to compare the signal received at first input terminal 226 (i.e., the DC value generated by amplifier 222 which is an analog value indicative of a magnitude of the output signal being generated by power amplifier 210) and the signal received at second input terminal 228 (i.e., the analog reference signal received from digital-to-analog converter 230).

If the signal received at first input terminal 226 is greater than the signal received at second input terminal 228 (i.e., the DC value indicative of the magnitude of the signal being generated by power amplifier 210 is greater than the analog reference signal), the output of comparator 224 at output terminal 232 has a first logical value (e.g., a 'high' value). This condition typically indicates that the power amplifier 210 of the vehicle radar system is operating nominally. Conversely, if the signal received at first input terminal 226 is less than the signal received at second input terminal 228 (i.e., the DC value indicative of the magnitude of the signal being generated by power amplifier 210 is less than the analog reference signal), the output of comparator 224 at output terminal 232 has a second logical value (e.g., a "low" value). This condition typically indicates that the power amplifier 210 of the vehicle radar system is not generating an output signal with sufficient power and that there may be a fault condition in the vehicle radar system. The logical output value generated by comparator 224 at output terminal 232 is supplied to digital block 204.

As described herein, digital block 204 of transmit power monitor 200 is configured to implement various routines and methods for monitoring the output power of power amplifier 210. Specifically, by determining and transmitting the digital threshold value to DAC 230, digital block 204 is configured to control the value of the analog signal output by digital-to-analog converter 230 and to which the DC peak-to-peak signal of the signal coupled from power amplifier 210 output is compared.

In various embodiments, digital block 204 is configured to operate continuously during normal operation of a vehicle's radar system. The digital block 204 may execute various calibration routines (as described herein) enabling transmit power monitor 200 to monitor the vehicle radar system's operations when the system is in a normal operational mode. In this case, the transmit power monitor 200 is configured to time continuously check the TX output power of power amplifier 210 to determine whether it is higher than the power level defined for the safety mode (e.g., 3 dB lower the normal power level). Once the transmit power monitor 200 determines that the power amplifier 210 TX power is less than the safety mode defined power level, the comparator 224 output goes to LOW, the ISM 206 sends a flag to the microcontroller ARM7 208 to request power recovery by reimplementing vehicle radar system calibration within a defined time slot. If the transmit power level is recovered, the comparator 224 output goes to high and the radar will continuously transmit and acquire radar signals. If the comparator 224 output indicates that the output power continues to fall below the safety threshold, then the ARM7 208 may trigger a full vehicle radar system reset. In that case, digital block 204 is configured to generate safety flag signal to alert various components of transmit power monitor 200 (or other controllers within the vehicle system) of the potential malfunction within the vehicle radar system.

Digital block 204 includes synchronization module 250 that includes an input terminal 252 that is connected to output terminal 232 of comparator 224 and configured to receive the output signal of comparator 224 that may have a low or high value depending upon whether the PPD of the signal generated by power amplifier 210 exceeds the analog value established by digital-to-analog converter 230. Synchronization block 250 consist of a number of digital flip flops, and synchronizes the digital signal using a clock signal.

The same synchronized output signal of synchronization block 250 is generated at output terminal 253 and 255. The signal outputted at terminal 253 is transmitted to input terminal 265 of multiplexer and the signal outputted at terminal 255 is transmitted to input terminal 260 of finite impulse response (FIR) filter 258.

FIR filter 258 is configured to smooth the signal received from synchronization block 250 and, specifically, to deglitch the output. If the value of the DC peak-to-peak signal supplied to comparator 224 at first input terminal 226 is relatively close to the analog reference value at second input terminal 228 of comparator 224, the output of comparator 224 may toggle as the amplifier 222 module output can be noisy. Such glitches can occur at the output of comparator 224 due to its input signals being close to one another, and where any small disturbance can easily cause the comparator 224 output to glitch following the unwanted disturbances. The glitchy output of comparator 224 can have transient components, which may result in false alarms that the connected vehicle radar system is experiencing malfunctions when, in fact, the alarm result from a temporary glitch in the signal generated by comparator 224. Consequently, the signal received at input terminal 260 of FIR filter 258 is passed through a series of successive delay elements contained within FIR filter 258 (and described in further detail with respect to FIG. 4 and below). Accordingly, the output of comparator 224 is synchronized in the digital domain through a flip flop of synchronization block 250 operating at a rate of Fs (sampling frequency) to generate a plurality of samples at each delay element of FIR filter 258. FIR filter 258 and flag generation module 270 then count how many samples are above the analog threshold and how many samples are below the analog threshold. The counter is activated during a window that has a programmable length. At the end of that window time, FIR filter 258 has stored internally how many samples are above the analog threshold and how many sample are below the analog threshold Those values are compared to a digital comparator and a decision is taken in flag generation module 270 whether to generate a flag. The digital threshold is programmable. As described above, the window during which the counter of FIR filter 258 is activated is programmable. Additionally, the digital comparator threshold of FIR filter 258 is programmable.

Figure 3:
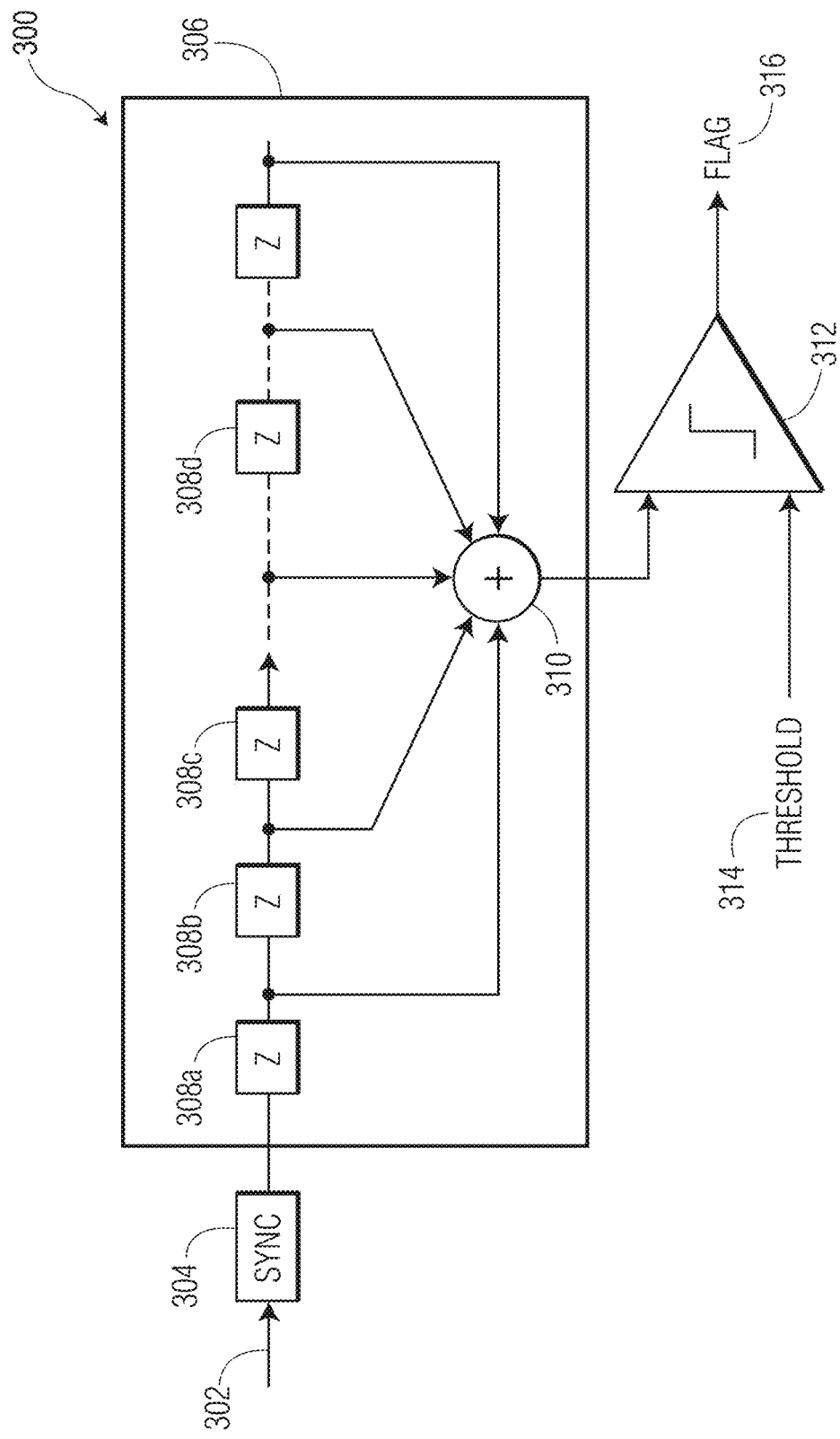
FIG. 3 is a block diagram depicting functional components of a finite impulse response (FIR) filter system that may be incorporated into a system for monitoring the output power of a power amplifier of a radar system.

To illustrate, FIG. 3 is a block diagram depicting functional components of an FIR filter system 300 that may be incorporated into the present system for monitoring the output power of a vehicle radar system. The components depicted in FIG. 3 provide analogous functionality to various components of transmit power monitor 200 of FIG. 2, as described below. Specifically, FIR filter system 300 includes an input terminal 302 (e.g., input terminal 252 of FIG. 2) that is coupled to a synchronization module 304 (e.g., synchronization block 250 of FIG. 2). An output of synchronization module 304 is connected to FIR filter 306 (e.g., FIR filter 258 of FIG. 2). FIR filter 306 includes a N-stage delay line including series-connected delay elements 308a, 308b, 308c, and 308d. In various implementations of FIR filter 306, FIR filter 306 may include more or fewer delay elements 308, depending upon the system implementation. Each delay element 308 is configured to implement a time-domain delay on the signal received from the preceding delay element 308 (or, in the case of delay element 308a, received from synchronization module 304). Each one of delay elements 308 may implement the same delay or the delay elements 308 may each implement different delays.

In various embodiments, FIR filter 306 may be programmed so that the number of enabled delay elements 308 can be controlled. During a calibration process (e.g., executed on samples of hardware implementing FIR filter system 300 within a typical application environment or on simulations of the same) a desired number of delay elements 308 may be identified and FIR filter system 300 may be programmed to use that number of delay elements 308 within FIR filter 306 following installation and use of transmit power monitor 200 in a deployed environment.

In an example implementation, for example, FIR filter 306 may be configured to utilize a delay line comprising 128 delay elements 308 to achieve sufficient accuracy while also mitigating the risk that transient signal accidentally generates inaccurate flag signals.

Within FIR filter 306, the outputs of the delay elements 308 are each compared to a programmable threshold value (referred to as a finite impulse response filter threshold) to determine a number of delay elements 308 outputting values exceeding the threshold value and falling below the threshold value. The number of delay elements 308 exceeding the threshold value is then outputted by FIR filter 306.

The output of FIR filter 306 (i.e., the number of delay elements delay elements 308 having values that exceed the FIR filter 306's programable threshold) is then compared to a threshold signal 314, where threshold signal 314 is a numerical value specifying a particular number of delay elements. If the signal received from summing node 310 indicates that a greater number of delay elements 308 than the threshold signal 314 had values exceeding FIR filter 306's programmable threshold, flag generation module 312 generates a flag output 316. If, however, the signal received from summing node 310 indicates that a fewer number of delay elements 308 than that specified by threshold signal 314 had values exceeding FIR filter 306's programmable threshold, no flag signal is generated by flag generation module 312.

For example, in a particular implementation, FIR filter 306 is configured to sample the output of comparator 224 at a rate of Fs=40 MHz (i.e., a sample taken every 25 nanoseconds (ns)) and has 128 delay elements 308 for a sample window for the 128 delay elements 308 of 3.2 microseconds (us) and where the threshold 314 of digital comparator 312 is set to a value of 64, in a condition where more than 64 of the 128 delay elements 308 having values above the digital threshold (e.g., indicating that the vehicle radar system is transmitting a signal at power levels that fall below the threshold for proper radar system operation), a flag output 316 is generated by flag generation module 312.

In such an implementation, in the case of a single glitch (e.g., where a single delay element 308 generates an incorrect output), the number of delay elements 308 having output values exceeding the threshold 314 will fall below the threshold 314 and no flag will be created based on that glitchy output of a single or small number of delay elements 308. In this manner, a short glitch that results in only a small number of the enabled delay elements 308 generating high values will be insufficient to cause the output of flag generation module 312 to go high indicating that flag 316 has been generated.

The implementation of FIR filter system 300 is configured to avoid the generation of a flag output 316 signal indicating a detected malfunction in response to transient signals contained within the signal received from synchronization module 304 because such transient signal may not be properly indicative of a vehicle radar system fault. By processing the signal through FIR filter system 300, the generation of incorrect or unnecessary flag signals due to signal glitches resulting from analog noise can be mitigated.

Returning to FIG. 2, once filtered through FIR filter 258, the filtered signal is supplied to input terminal 267 of multiplexer 266. Multiplexer 266 is configured to receive a control input that determines whether the signal received at terminal 265 or the signal received at terminal 267 is transmitted to the output terminal 269 of multiplexer 266. In some implementations, for example, multiplexer 266 may be configured so that when transmit power monitor 200 is operating in a calibration mode (as described below), the input received at terminal 265 of multiplexer 266 is transmitted to the output 269 of multiplexer 266. In that manner, during execution of the calibration routine, FIR filter 258 may be bypassed, potentially speeding up and simplifying the calibration process. Then, during normal operation of transmit power monitor 200, multiplexer 266 may be configured so that the input signal received at terminal 267 of multiplexer 266 is transmitted to the output 269 of multiplexer 266, thereby providing that the signal filtered by FIR filter 258 is outputted at output 269.

The signal output at output 269 of multiplexer 266 is transmitted to flag generation module 270, which may be a logic module configured to determine whether the signal received from multiplexer 266 has a high value (e.g., indicating that the output power generated by power amplifier 210 and coupled into transmit power monitor 200 by coupler 212 is greater than the analog reference signal). If so, flag generation module 270 may determine that output power level of power amplifier 210 is adequate and flag generation module 270 may not generate a flag or alert signal. If, however, flag generation module 270 determines that the signal received from multiplexer 266 has a low value (e.g., indicating that the output power generated by power amplifier 210 and coupled into transmit power monitor 200 by coupler 212 is less than the analog reference signal), flag generation module 270 may determine that the output power level of power amplifier 210 is too low (e.g., falling below a safety threshold) and flag generation module 270 may generate a system flag or alert signal indicating that there may be a potential fault in power amplifier 210 or other system components.

The flag or alert signal generated by generation module 270 is transmitted to ISM 206. Upon receipt of the flag or alert signal, ISM 206 may take any appropriate action. In embodiments, receipt of the flag or alert signal may cause ISM 206 to initiate a reset of transmit power monitor 200 and/or the vehicle's radar system or to shut down the vehicle radar system entirely. In other embodiments, receipt of the flag or alert signal may cause ISM 206 to generate an alert or output that may alert an operator of the vehicle or system to which transmit power monitor 200 is coupled to a potential fault or error condition in the vehicle or the coupled radar system. In still other embodiments, receipt of the flag or alert signal may cause ISM 206 to set a system flag in a log or data that may be accessible to systems or modules configured to retrieve log data for transmit power monitor 200 or other connected systems (e.g., vehicle radar systems). In a specific embodiment, after a flag is received from transmit power monitor 200 indicating that the power of the signal being transmitted by the vehicle radar system has fallen below a safety threshold, the flag is sent to ISM 206 causing its safety manager to launch a software recovery of the vehicle radar system by recalibration. If the recovery is not successful before the end of an alarm timer, then ISM 206 may cause a reset of one or more hardware components of the vehicle radar system. In various embodiments, a vehicle control system may be configured to take other actions upon receipt of the flag from transmit power monitor 200. Depending on the severity of the flag, for example, it may be decided to reset the flag and log the flag it in a memory for later analysis. In some cases, upon detection of the flag, the vehicle may be disabled (e.g., in the case of autonomous vehicles that cannot travel safely without proper vehicle radar system operation).

ISM 206 is connected to ARM7 block 208 via control signal line 272 and can cause ARM7 block 208 to generate an output control signal at terminal 274, where the control signal includes a digital threshold value (e.g., a 6-bit digital value). The digital threshold value is output to register 276, which includes a memory system, such as a non-volatile or volatile memory system, configured to store the digital threshold value received from ARM7 block 208. The digital threshold value stored by register 276 is transmitted to digital-to-analog converter 230 to cause digital-to-analog converter 230 to generate an output analog signal, where a magnitude of that analog signal is determined by the digital threshold value transmitted to digital-to-analog converter 230 and stored by register 276.

The digital threshold value generated by ARM7 block 208 and stored within register 276 may comprise a range of values, where each value is associated with a different equivalent analog signal output of digital-to-analog converter 230. In an embodiment, as the value of digital threshold value increases, the equivalent analog signal output by digital-to-analog converter 230 increases in a corresponding manner. The relationship of the two values may be linear, or could comprise other relationships, such as geometric, exponential, or other mathematical relationships. In another equivalent embodiment, the digital threshold value may have an inverse relationship with the correspondent analog signal output by digital-to-analog converter 230, so that as the digital threshold value increases, the corresponding analog signal output by digital-to-analog converter 230 decreases.

In various embodiments, ISM 206 may further be configured to control an operation of multiplexer 266 to control whether the signal received at terminal 265 or terminal 267 of multiplexer 266 is passed to output 269, thereby selecting whether FIR filter 258 is bypassed. ISM 206 may control the operation of multiplexer 266 by transmitting a control signal using control signal line 272 to ARM7 block 208, which causes ARM7 block 208 to transmit a corresponding control signal to register 276, causing register 276 to transmit a corresponding control signal to multiplexer 266 to cause multiplexer 266 to transmit the signal received at either terminal 265 or terminal 267 to output 269 and flag generation module 270.

During operation of transmit power monitor 200 in conjunction with a vehicle radar system, transmit power monitor 200 may execute a calibration routine to determine an appropriate digital threshold value (i.e., the digital value supplied to digital-to-analog converter 230) so that if the power of the output signal of power amplifier 210 falls below a desired threshold an appropriate flag signal can be generated by flag generation module 270.

Figure 4:
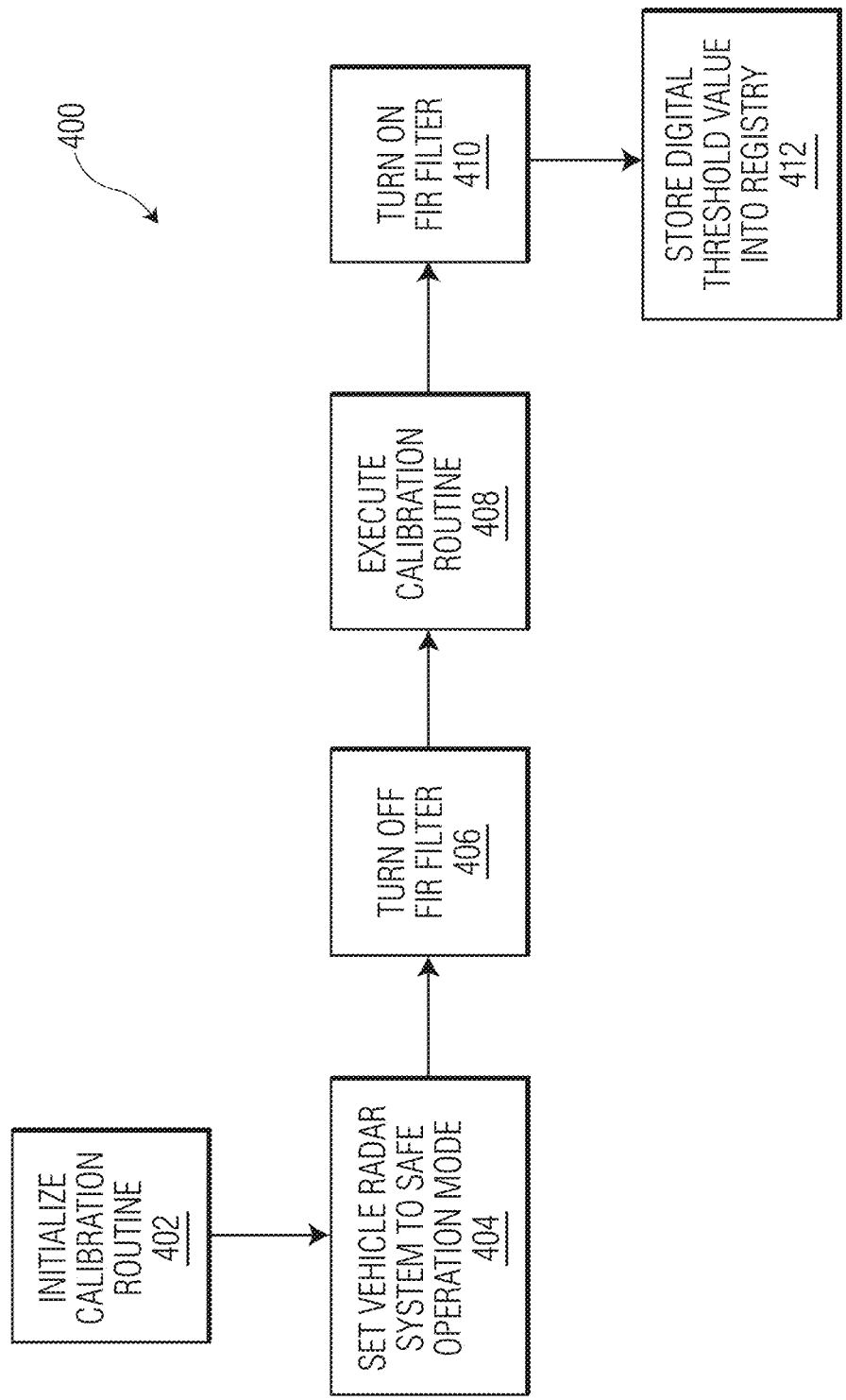
FIG. 4 is a flow chart depicted a method for calibrating a time-continuous power monitor (TCM) for a power amplifier of a vehicle radar system.

FIG. 4 is a flow chart depicted a method 400 for calibrating transmit power monitor 200 of FIG. 2. Method 400 may be implemented by any suitably configured components or collection of components (e.g., system controllers or collections of controllers) of transmit power monitor 200. In one specific implementation, however, method 400 may be implemented by ARM7 block 208 of FIG. 2.

In step 402, the controller executing method 400 initiates the calibration routine. The calibration routine may be initiated in response to a power-on event, the triggering of a self-test or diagnostic routine requiring calibration of transmit power monitor 200, or any other event that may require execution of calibration routine. In some cases, calibration may be triggered manually such as by a technician investigating the operation of transmit power monitor 200 or by engineers or mechanics as part of a self-test when installing transmit power monitor 200 in conjunction with a vehicle radar system.

With the calibration routine initiated, in step 404 the controller executing method 400 causes the connected vehicle radar system to enter a safe operation mode. In that safe operation mode, the vehicle radar system is configured to generate an output transmitted signal having a power level equal to a minimum allowable output power level or a minimum operational transmit power of the vehicle radar system. In typical embodiments, the controller executing method 400 causes the vehicle radar system to enter this mode of operation by transmitting an instruction to the vehicle radar system to cause the vehicle radar system to enter safe operation mode.

Depending upon the configuration of vehicle radar system, the power level of the safety mode may be 3 dB below the power level of the system's output signal during normal operation, although the safety mode may be associated with different reductions in power level from normal operations (e.g., the safety power level may be 2 dB, 10 dB or other values less than the normal operating power).

When setting the vehicle radar system to its safety mode, the vehicle radar system may monitor its output power using various systems and technologies (e.g., various peak-to-peak monitoring systems and BIST sensors systems) for monitoring its operation to confirm that the power output of the vehicle radar system accurately matches its specification for safety mode.

With the vehicle radar system set to its safety mode (i.e., at the reduced power output), in an optional step 406, the controller may turn off the operation of the FIR filter (i.e., FIR filter 258 or FIR filter 306) that may otherwise be operational to filter the data signal being passed through transmit power monitor 200. By turning off the FIR filter, any signal delays that may be introduced by the various delay elements of the FIR filter are avoided thereby providing that the calibration routine may be complete efficiently.

Figure 5:
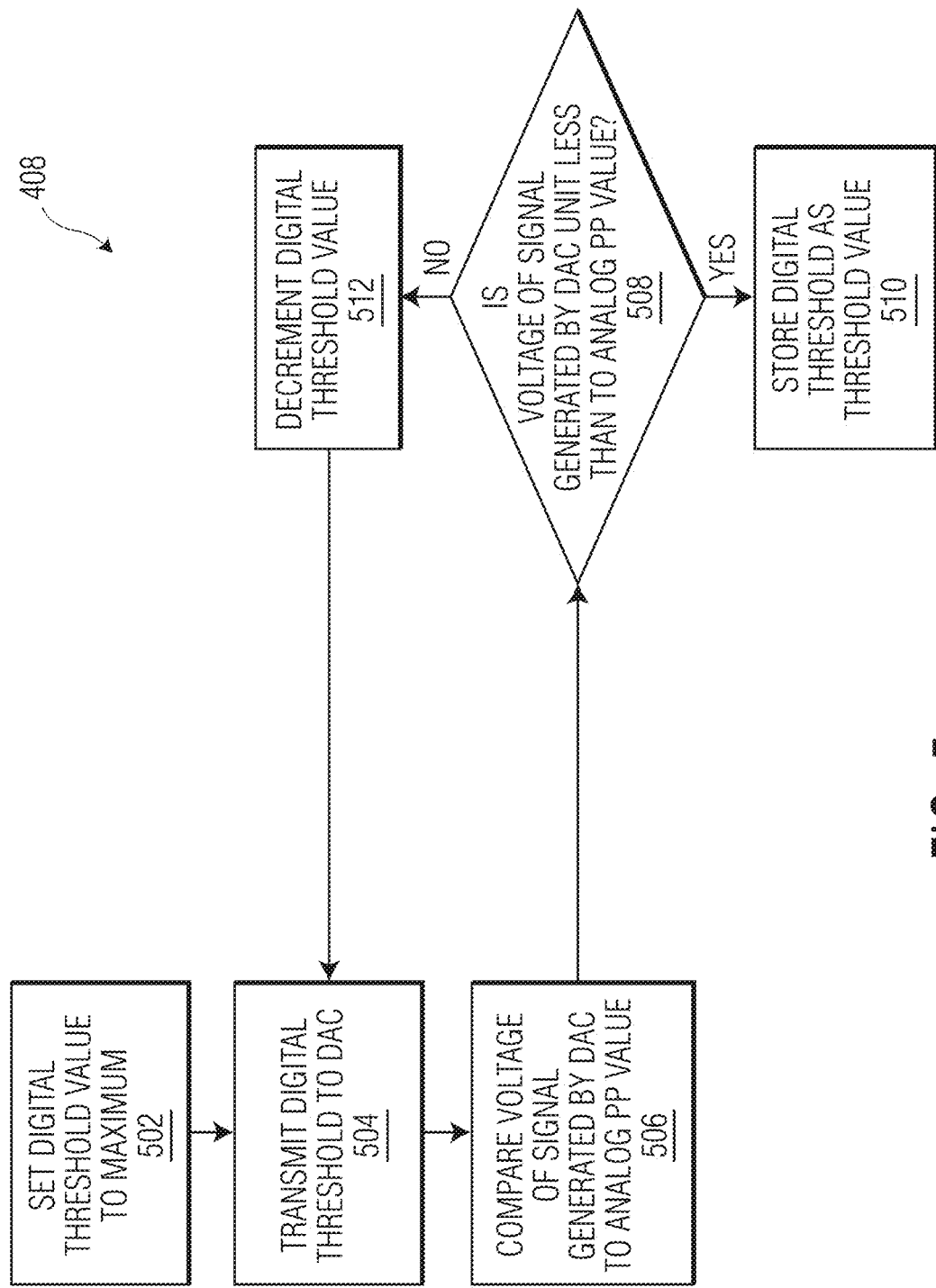
FIG. 5 is a flow chart depicting specific steps of a method to implement a calibration routine for a time-continuous power monitor (TCM) for a power amplifier of a vehicle radar system.

In step 408, with the vehicle radar system operating in its safety mode and with the system's FIR filter (optionally) turned off, the calibration routine is executed. FIG. 5 is a flow chart depicting individual steps that may be performed when executing the calibration routine of step 408.

In step 502, the controller executing method 400 sets a digital threshold value equal to a maximum value (i.e., the digital threshold value that corresponds to the highest analog voltage). With the digital threshold value set to the maximum value in step 504, the controller transmits the digital threshold value to digital-to-analog converter 230 to cause digital-to-analog converter 230 to output a corresponding maximum analog reference signal in response to that digital input.

In step 506, the analog reference signal output by digital-to-analog converter 230 in response to the digital input is compared to the DC power measurement signal generated by amplifier 222. The two signals may be compared, for example, by comparator 224 of FIG. 2. In step 508 a determination is made (e.g., by flag generation module 270 of FIG. 2) as to whether the analog reference signal output by digital-to-analog converter 230 is greater than the DC power measurement signal generated by amplifier 222. If so, that condition indicates that the current digital threshold value is set to a value equivalent to the DC power measurement signal generated by amplifier 222 and, thereby, equivalent to the minimum allowable power output of the vehicle radar system. Consequently, in step 510, the current digital reference value is stored (e.g., into register 276) and will be used as the digital threshold value for use during normal operation of the vehicle radar system and transmit power monitor 200.

If, however, in step 508 it is determined that the analog reference signal output by digital-to-analog converter 230 is less than the DC power measurement signal generated by amplifier 222, the method moves to step 512 in which the digital reference value is reduced or decremented, and the calibration process returns to step 504 to repeat. In this manner, the loop formed by steps 504, 506, 508, and 512 repeats until the digital threshold value has been reduced by a sufficient amount so that the equivalent analog reference signal output by digital-to-analog converter 230 is greater than the DC power measurement signal generated by amplifier 222.

In this manner, the calibration routine implemented as step 408 is configured to identify the digital threshold value that causes digital-to-analog converter 230 to output a corresponding analog reference signal that is approximately equal to the power of the signal received from amplifier 222 when the vehicle radar system (and, specifically, power amplifier 210 of the vehicle radar system) is operating at power levels equivalent to the radar system's safety mode of operation. Accordingly, if the power of the signal received from amplifier 222 falls below the power level of the signal output by digital-to-analog converter 230, that condition indicates the power level of the radar signals being generated by the vehicle radar system may have fallen below that required for normal operation. As such, a flag may be generated resulting in the resetting of the vehicle radar system, transmit power monitor 200, or other actions such as then the generation of warning lights or fault alarms.

It will be apparent to a person of ordinary skill in the art that the calibration algorithm depicted in FIG. 5 could be reversed such that in the initial step 502 the digital reference value is instead set to a minimum value and the algorithm could be implemented so that the digital reference value is continuously increased or incremented until the analog reference signal output by digital-to-analog converter 230 is greater than the DC power measurement signal generated by amplifier 222, at which time the value of the digital reference signal could be stored as the digital threshold value.

In general, the calibration routine described herein may be executed in accordance with various approaches to determine the digital threshold value that causes digital-to-analog converter 230 to output a corresponding analog reference signal that is approximately equal to the power of the signal received from amplifier 222 when the vehicle radar system (and, specifically, power amplifier 210 of the vehicle radar system) is operating at power levels equivalent to the radar system's safety mode of operation.

Returning to FIG. 4, after the calibration routine of step 408 is complete, the controller may enable the FIR filter (assuming the FIR filter was turned off or bypassed in step 406) to enable normal operation of transmit power monitor 200. Finally, in step 412, the digital threshold value that was generated by the calibration step 408 may be loaded into register 276.

With the digital threshold value loaded into register 276, the vehicle radar system can be put into normal operation mode (e.g., via instruction from a controller such as an ARM7 controller). While the vehicle radar system is operational in its normal operating mode, transmit power monitor 200 continuously monitors the vehicle radar system's output power level. If that output power level (or, specifically, the power level of the signal generated by amplifier 222) should fall below the analog threshold value determined by the digital threshold value, flag generation module 270 can generate a flag output, which is transmitted to ISM 206.

In an embodiment, the techniques described herein relate to a system, including a vehicle radar subsystem that includes an amplifier configured to generate a first output signal at an output terminal of the amplifier, a coupler electrically connected to the output terminal of the amplifier, wherein the coupler is configured to output a second output signal, wherein the second output signal corresponds to the first output signal, and a digital-to-analog converter configured to receive, at an input terminal of the digital-to-analog converter, a digital threshold signal encoding a digital threshold value, and generate, using the digital threshold value, an analog threshold signal at an output terminal of the digital-to-analog converter, wherein a first magnitude of the analog threshold signal is at least partially determined by the digital threshold value and represents a minimum threshold power output of the first output signal. The system includes a comparator electrically connected to the digital-to-analog converter and the coupler, the comparator being configured to compare the second output signal to the analog threshold signal to generate a third output signal at an output terminal of the comparator, and a flag generation module electrically connected to the comparator, the flag generation module being configured to: receive the third output signal, determine that the third output signal has a first value indicative of a potential vehicle radar subsystem fault, and transmit a flag signal to a system controller, the flag signal indicating that a power level of the first output signal has fallen below a safety threshold value.

In another embodiment, a system includes a digital-to-analog converter configured to generate an analog threshold signal at an output terminal of the digital-to-analog converter, wherein the analog threshold signal is determined by a digital threshold value received at an input terminal of the digital-to-analog converter. The system includes a comparator configured to receive, at a first input terminal of the comparator, a first input signal, wherein the first input signal corresponds to an output transmitted signal of a vehicle radar system, receive, at a second input terminal of the comparator, the analog threshold signal, and generate a first output signal when the first input signal has a first magnitude less than a second magnitude of the analog threshold value. The system includes a controller configured to perform steps including causing the vehicle radar system to generate the output signal at a first power level, wherein the first power level corresponds to a minimum operational transmit power of the vehicle radar system, transmitting a first digital input signal to the first input terminal of the digital-to-analog converter, the first digital input signal encoding a first digital value, determining that the comparator is not generating the first output signal, transmitting a second digital input signal to the first input terminal of the digital-to-analog converter, the second digital input signal encoding a second digital value, determining that the comparator is generating the first output signal, and responsive to determining that the comparator is generating the first output signal, determining the digital threshold value is equal to the second digital value.

In another embodiment, a method includes receiving a first input signal that corresponds to an output transmitted signal of an amplifier of a vehicle radar system, transmitting a digital threshold signal to an input terminal of a digital-to-analog converter, wherein the digital-to-analog converter is configured to generate an analog threshold value that is at least partially determined by a digital threshold value encoded into the digital threshold signal, determining that a magnitude of the first input signal is less than a magnitude of the analog threshold value, and transmit a flag signal to a system controller, wherein the flag signal is indicative of a potential fault in the vehicle radar system.

Various systems and methods described herein may be implemented in computer code running on a processor or controller system and may include code portions for performing steps of various method according to the disclosure when run on a programmable apparatus, such as a controller or enabling a controller to perform functions of a device or system according to the disclosure. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units, or devices, for example via intermediate devices.

Accordingly, unless implied or stated otherwise the connections may for example be direct connections or indirect connections. However, other modifications, variations and alternatives are also possible. The specifications and drawings are, accordingly, to be regarded in an illustrative rather than in a restrictive sense.

Although the examples have been described with reference to vehicle radar systems, the systems and methods described herein may be implemented in conjunction with other types of radar systems. Devices or components described as being separate may be integrated in a single physical device. Also, the units and circuits may be suitably combined in one or more semiconductor devices. That is, the devices described herein may be implemented as a single integrated circuit, or as multiple integrated circuits.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system, comprising:
a vehicle radar subsystem that includes an amplifier configured to generate a first output signal at an output terminal of the amplifier;
a coupler electrically connected to the output terminal of the amplifier, wherein the coupler is configured to output a second output signal, wherein the second output signal corresponds to the first output signal;
a digital-to-analog converter configured to:
receive, at an input terminal of the digital-to-analog converter, a digital threshold signal encoding a digital threshold value, and
generate, using the digital threshold value, an analog threshold signal at an output terminal of the digital-to-analog converter, wherein a first magnitude of the analog threshold signal is at least partially determined by the digital threshold value and represents a minimum threshold power output of the first output signal;
a comparator electrically connected to the digital-to-analog converter and the coupler, the comparator being configured to compare the second output signal to the analog threshold signal to generate a third output signal at an output terminal of the comparator; and
a flag generation module electrically connected to the comparator, the flag generation module being configured to:
receive the third output signal,
determine that the third output signal has a first value indicative of a potential vehicle radar subsystem fault, and
transmit a flag signal to a system controller, the flag signal indicating that a power level of the first output signal has fallen below a safety threshold value.

2. The system of claim 1, wherein the system controller is configured to execute a calibration routine to determine the digital threshold value.

3. The system of claim 2, wherein the system controller is configured to execute the calibration routine by at least one of incrementing and decrementing the digital threshold value through a plurality of digital values to determine the digital threshold value.

4. The system of claim 2, wherein the system controller is configured to execute the calibration routine by performing steps including:
causing the vehicle radar subsystem to enter a mode of operation in which the first output signal has a power equal to a minimum operational transmit power of the vehicle radar subsystem;
transmitting a first digital threshold signal to the first input terminal of the digital-to-analog converter, the first digital threshold signal encoding a first digital threshold value that is set to a maximum digital value;
determining that the third output signal has a second value that is not indicative of the potential vehicle radar subsystem fault;
transmitting a second digital threshold signal to the first input terminal of the digital-to-analog converter, the second digital threshold signal encoding a second digital threshold value that is less than the maximum digital value;
determining that the third output signal has the first value that is indicative of the potential vehicle radar subsystem fault; and
setting the digital threshold value equal to the second digital input value.

5. The system of claim 1, further comprising a finite impulse response filter electrically coupled to the output terminal of the comparator, wherein the finite impulse response filter includes a plurality of delay elements and an output of the finite impulse response filter is determined by comparing an output of each delay element in the plurality of delay elements to a finite impulse response filter threshold value.

6. The system of claim 5, wherein the flag generation module is configured to compare a number of delay elements in the plurality of delay elements having outputs exceeding the finite impulse response filter threshold value to a predetermined number of delay elements to determine that the third output signal has a first value indicative of a potential vehicle radar subsystem fault.

7. The system of claim 1, further comprising a register configured to store the digital threshold value in a non-volatile memory and wherein the register is electrically connected to the input terminal of the digital-to-analog converter.

8. The system of claim 1, wherein the first output signal generated by the amplifier is a differential first output signal and the coupler includes a capacitive coupler and/or a millimeter-wave directional coupler.

9. The system of claim 8, further comprising a peak-to-peak detector electrically connected between the coupler and the amplifier.

10. The system of claim 9, wherein the peak-to-peak detector includes a closed-loop operational amplifier configured to generate a direct current signal having a second magnitude that is proportional to a third magnitude of the first output signal.

11. The system of claim 1, wherein the system controller, after receiving the flag signal, is configured to at least one of initiate a recalibration routine of the vehicle radar subsystem and reset at least one hardware component of the vehicle radar subsystem.

12. A system, comprising:
a digital-to-analog converter configured to generate an analog threshold signal at an output terminal of the digital-to-analog converter, wherein the analog threshold signal is determined by a digital threshold value received at an input terminal of the digital-to-analog converter;

a comparator configured to:
    receive, at a first input terminal of the comparator, a first input signal, wherein the first input signal corresponds to an output transmitted signal of a vehicle radar system,
    receive, at a second input terminal of the comparator, the analog threshold signal, and
    generate a first output signal when the first input signal has a first magnitude less than a second magnitude of the analog threshold value; and a controller, configured to perform steps including:
    causing the vehicle radar system to generate the output signal at a first power level, wherein the first power level corresponds to a minimum operational transmit power of the vehicle radar system;
    transmitting a first digital input signal to the first input terminal of the digital-to-analog converter, the first digital input signal encoding a first digital value;
    determining that the comparator is not generating the first output signal;
    transmitting a second digital input signal to the first input terminal of the digital-to-analog converter, the second digital input signal encoding a second digital value;
    determining that the comparator is generating the first output signal; and
    responsive to determining that the comparator is generating the first output signal, determining the digital threshold value is equal to the second digital value.

13. The system of claim 12, further comprising a finite impulse response filter electrically coupled to the second output terminal of the comparator, wherein the finite impulse response filter includes a plurality of delay elements and an output of the finite impulse response filter is determined by comparing an output of each delay element in the plurality of delay elements to a finite impulse response filter threshold value.

14. The system of claim 13, further comprising a flag generation module configured to compare a number of delay elements in the plurality of delay elements having outputs exceeding the finite impulse response filter threshold value to a predetermined number of delay elements.

15. The system of claim 12, wherein the first input signal is received from a coupler electrically connected to an output terminal of an amplifier of the vehicle radar system.

16. The system of claim 12, wherein the system controller, after receiving the first output signal, is configured to at least one of initiate a recalibration routine of the vehicle radar system and reset at least one hardware component of the vehicle radar system.

17. A method, comprising:
    receiving a first input signal that corresponds to an output transmitted signal of an amplifier of a vehicle radar system;
    transmitting a digital threshold signal to an input terminal of a digital-to-analog converter, wherein the digital-to-analog converter is configured to generate an analog threshold value that is at least partially determined by a digital threshold value encoded into the digital threshold signal;
    determining that a magnitude of the first input signal is less than a magnitude of the analog threshold value;
    transmit a flag signal to a system controller, wherein the flag signal is indicative of a potential fault in the vehicle radar system; and
    executing a calibration routine to determine the digital threshold value by performing steps including:
        transmitting a first digital input signal to the input terminal of the digital-to-analog converter, the first digital input signal encoding a first digital value;
        determining that the flag signal is not transmitted to the system controller;
        supplying a second digital input signal to the first input terminal of the digital-to-analog converter, the second digital input signal encoding a second digital value;
        determining that the flag signal is being transmitted to the system controller; and
        determining the digital threshold value is equal to the second digital value.

18. The method of claim 17, further comprising executing the calibration routine by at least one of incrementing and decrementing the digital threshold value through a plurality of digital values to determine the digital threshold value.

* * * * *